United States Patent
Daugs et al.

(10) Patent No.: US 7,199,193 B2
(45) Date of Patent: Apr. 3, 2007

(54) POLYETHYLENE GLYCOL COMPOUNDS AND PROCESS OF MAKING

(75) Inventors: Edward D. Daugs, Midland, MI (US); Robert B. Appell, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 251 days.

(21) Appl. No.: 10/952,198

(22) Filed: Sep. 28, 2004

(65) Prior Publication Data

US 2006/0074200 A1    Apr. 6, 2006

(51) Int. Cl.
*C08G 65/32*    (2006.01)
(52) U.S. Cl. ............... 525/403; 568/618; 568/620; 568/678; 568/679; 568/698
(58) Field of Classification Search ............... 525/403; 568/618, 620, 678, 679, 698
See application file for complete search history.

(56) References Cited

U.S. PATENT DOCUMENTS

| | | | |
|---|---|---|---|
| 5,366,735 A | 11/1994 | Henry | 424/426 |
| 6,280,745 B1 | 8/2001 | Flore et al. | 424/400 |
| 6,455,639 B1 | 9/2002 | Yasukohchi et al. | 525/408 |
| 6,469,218 B1 * | 10/2002 | Rexin et al. | 568/620 |

FOREIGN PATENT DOCUMENTS

EP    0 985 697    3/1999
WO    WO-2005/010075    2/2005

OTHER PUBLICATIONS

Zalipsky, Functionalized Poly(ethylene glycol) for Preparation of Biologically Relevant Conjugates., Bioconjugate Chem., 1995, 6, p. 150-165.
Hermanson, Modification with Synthetic Polymers, Bioconjuate Techniques (1996), 606-629.
Roberts et al., Chemistry for peptide and protein PEGylation, Advanced Drug Delivery Reviews 54 (2002) p. 259-4.
Kazanskii et al., Strictly Monofunctional Methyl Ethers of Poly-(ethylene glycol) and the Related Methacrylate Macromonomers, Polymer Science, Series A, vol. 42, No. 6 (2000), p. 585-595.
Gorshkov et al., "Chromatographic investigations of macromolecules in the "critical range" of liquid chromatography," *Journal of Chromatography*, vol. 523, pp. 91-102, 1990.

* cited by examiner

*Primary Examiner*—Rosalynd Keys

(57) ABSTRACT

A process for making substituted polyethylene glycol compound. The compound has the formula $RO(C_2H_4O)_nH$ wherein R represents a C1–7 hydrocarbon group and n represents the average number of moles of $C_2H_4O$ groups, ranging from 500 to 2000. The compound has a ratio of weight average molecular weight to a number average molecular weight in the range of from 1 to 1.1. The compound contains less than ten weight percent polyethylene glycol. The gist of the process is the use of a polyether solvent, wherein the n value of the compound ranges from 600 to 2000.

15 Claims, No Drawings

POLYETHYLENE GLYCOL COMPOUNDS AND PROCESS OF MAKING

BACKGROUND

The instant invention relates to polyethylene glycol compounds and a process for making such compounds. More particularly, the instant invention relates to high molecular weight polyethylene glycol compounds having narrow molecular weight distribution and a process for making such compounds. The polyethylene glycol compounds of the instant invention are useful for chemical modification of physiologically active materials, which modified materials are applicable, for example, in drug delivery systems.

Biologically active compounds conjugated with polyoxyalkylenes can provide enhanced biocompatibility for the compound, See, for example, U.S. Pat. No. 5,366,735 and U.S. Pat. No. 6,280,745. A review of this subject by Zalipsky, in Bioconjugate Chem., 1995, 6, p150–165, identified polyethylene glycol as one of the best biocompatible polymers to conjugate with a biologically active compound (such as a drug, a protein, a peptide or an enzyme) to produce a conjugate having improved properties such as compatible solubility characteristics, reduced toxicity, improved surface compatibility, increased circulation time and reduced immunogenicity.

Polyethylene glycol (PEG) is a linear polyoxyalkylene terminated at the ends thereof with hydroxyl groups and generally represented by the formula: $HO(CH_2CH_2O)_nH$. As discussed by Henmanson in Chapter 15 of Bioconjugate Techniques (1996), monomethoxy polyethylene glycol (mPEG) generally represented by the formula: $CH_3O(CH_2CH_2O)_nH$, is usually used to prepare a polyethylene glycol conjugate with a biologically active compound typically by way of a coupling reaction between an amine group of the biologically active compound and an amine receptive derivative (such as trichloro-s-triazine activated mPEG) formed via the remaining terminal hydroxyl group of the monomethoxy polyethylene glycol.

More recently, so called "second generation" PEGylation chemistry has been developed to, for example, minimize problems of diol impurity contamination of mPEG, to increase the molecular weight of the mPEG and to increase stability of the conjugate, see Roberts et al., Advanced Drug Delivery Reviews 54 (2002) p459–4. U.S. Pat. No. 6,455,639 (herein fully incorporated by reference) described an increased molecular weight mPEG having narrow molecular weight distribution. However, the highest molecular weight disclosed in the '639 patent was 20,861 (weight average molecular weight). It would be a further advance in the art if even higher molecular weight, narrow molecular weight distribution mPEG were discovered along with a processes to produce such a material.

SUMMARY OF THE INVENTION

The instant invention is a substituted polyethylene glycol compound having higher molecular weight than has previously been obtained (for example, mPEG molecular weights in excess of 40,000) together with narrow molecular weight dispersion and low diol impurity contamination. The instant invention is also a process for making such materials.

More specifically, the instant invention is a substituted polyethylene glycol compound having the formula $RO(C_2H_4O)_nH$ wherein R represents a $C_{1-7}$ hydrocarbon group and n represents the average number of moles of $C_2H_4O$ groups, ranging from 500 to 2000, the substituted polyethylene glycol compound having a ratio of weight average molecular weight to a number average molecular weight in the range of from 1 to 1.1, the weight average molecular weight and the number average molecular weight of the substituted polyethylene glycol compound being determined by gel permeation chromatography.

In another embodiment, the instant invention is a mixture comprising a substituted polyethylene glycol compound and polyethylene glycol, the substituted polyethylene glycol compound having the formula $RO(C_2H_4O)_nH$ wherein R represents a $C_{1-7}$ hydrocarbon group; and n represents the average number of moles of $C_2H_4O$ groups added, ranging from 500 to 2000, the substituted polyethylene glycol compound having a ratio of weight average molecular weight to number average molecular weight as determined by gel permeation chromatography in the range of from 1 to 1.1, the weight average molecular weight and the number average molecular weight of the substituted polyethylene glycol compound being determined by gel permeation chromatography, the amount of polyethylene glycol being less than ten mole percent of the total moles of polyethylene glycol and the substituted polyethylene glycol compound, the concentration of the polyethylene glycol being determined by liquid chromatography under critical conditions.

In yet another embodiment, the instant invention is a process for the preparation of a substituted polyethylene glycol compound having the formula $RO(C_2H_4O)_nY$ wherein R represents a $C_{1-7}$ hydrocarbon group, n represents the average number of moles of $C_2H_4O$ groups, ranging from 500 to 2000 and Y represents hydrogen or an alkali metal, the substituted polyethylene glycol compound having a ratio of weight average molecular weight to number average molecular weight in the range of from 1 to 1.1, the weight average molecular weight and the number average molecular weight of the substituted polyethylene glycol compound being determined by gel permeation chromatography, comprising the steps of: (a) forming a reaction mixture comprising an alcohol represented by the formula R(OCH2CH2)0–20OH, where R represents a $C_{1-7}$ hydrocarbon group, an alkoxide of the alcohol and an aprotic polar solvent, the reaction mixture being at a temperature in the range of from about 80 to about 140 degrees Celsius, the water concentration of the reaction mixture being less than ten parts per million by weight, the mole ratio of the alkoxide of the alcohol to the alcohol being in the range of from about 0.01 to about 100; (b) contacting the reaction mixture with ethylene oxide so that the ethylene oxide reacts therein to form the substituted polyethylene glycol compound.

In another embodiment, the instant invention is also a process for the preparation of a substituted polyethylene glycol compound having the formula $RO(C_2H_4O)_nY$ wherein R represents a $C_{1-7}$ hydrocarbon group, n represents the average number of moles of $C_2H_4O$ groups, ranging from 100 to 2000 and Y represents hydrogen or an alkali metal, the substituted polyethylene glycol compound having a ratio of weight average molecular weight to number average molecular weight in the range of from 1 to 1.1, the weight average molecular weight and the number average molecular weight of the substituted polyethylene glycol compound being determined by gel permeation chromatography, comprising the steps of: (a) forming a reaction mixture comprising an alcohol represented by the formula $R(OCH_2CH_2)_{0-20}OH$, where R represents a $C_{1-7}$ hydrocarbon group, an alkoxide of the alcohol and a polyether solvent, the reaction mixture being at a temperature in the range of from about 80 to about 140 degrees Celsius, the water concentration of the reaction mixture being less than ten parts per million by weight, the mole ratio of the alkoxide of the alcohol to the alcohol being in the range of from about 0.01 to about 100; (b) contacting the reaction mixture with ethylene oxide so that the ethylene oxide reacts therein to form the substituted polyethylene glycol compound.

DETAILED DESCRIPTION OF THE INVENTION

The instant invention is a substituted polyethylene glycol compound having the formula $RO(C_2H_4O)_nH$ wherein R represents a $C_{1-7}$ hydrocarbon group and n represents the average number of moles of $C_2H_4O$ groups, ranging from 500 to 2000, the substituted polyethylene glycol compound having a ratio of weight average molecular weight to a number average molecular weight in the range of from 1 to 1.1, the weight average molecular weight and the number average molecular weight of the substituted polyethylene glycol compound being determined by gel permeation chromatography. It should be understood that the above weight and number average molecular weights are determined based on all polymer peaks in the chromatogram and not a selected portion thereof. When R is methyl, then the compound is mPEG. Preferably, n is in the range of from 600 to 2000. More preferably, n is in the range of from 700 to 1000.

In another embodiment, the instant invention is a mixture comprising a substituted polyethylene glycol compound and polyethylene glycol, the substituted polyethylene glycol compound having the formula $RO(C_2H_4O)_nH$ wherein R represents a $C_{1-7}$ hydrocarbon group; and n represents the average number of moles of $C_2H_4O$ groups added, ranging from 500 to 2000, the substituted polyethylene glycol compound having a ratio of weight average molecular weight to number average molecular weight as determined by gel permeation chromatography in the range of from 1 to 1.1, the amount of polyethylene glycol being less than ten mole percent of the total moles of polyethylene glycol and the substituted polyethylene glycol compound, the concentration of the polyethylene glycol being determined by liquid chromatography under critical conditions. Again, it should be understood that the above weight and number average molecular weights are determined based on the entire chromatogram and not a selected portion thereof. Preferably, n is in the range of from 600 to 2000. More preferably, n is in the range of from 700 to 1000.

Preferably, the amount of polyethylene glycol is less than five mole percent of the total moles of polyethylene glycol and the substituted polyethylene glycol compound. More preferably, the amount of polyethylene glycol being less than two and one half mole percent of the total moles of polyethylene glycol and the substituted polyethylene glycol compound. A specific critical condition liquid chromatography method for the determination of polyethylene glycol is outlined below.

The process of the instant invention in one embodiment is a process for the preparation of a substituted polyethylene glycol compound having the formula $RO(C_2H_4O)_nY$ wherein R represents a $C_{1-7}$ hydrocarbon group, n represents the average number of moles of $C_2H_4O$ groups, ranging from 500 to 2000 and Y represents hydrogen or an alkali metal, the substituted polyethylene glycol compound having a ratio of weight average molecular weight to number average molecular weight in the range of from 1 to 1.1, the weight average molecular weight and the number average molecular weight of the substituted polyethylene glycol compound being determined by gel permeation chromatography, comprising the steps of: (a) forming a reaction mixture comprising an alcohol represented by the formula $R(OCH_2CH_2)_{0-20}OH$, where R represents a $C_{1-7}$ hydrocarbon group, an alkoxide of the alcohol and an aprotic polar solvent, the reaction mixture being at a temperature in the range of from about 80 to about 140 degrees Celsius, the water concentration of the reaction mixture being less than ten parts per million by weight, the mole ratio of the alkoxide of the alcohol to the alcohol being in the range of from about 0.01 to about 100; (b) contacting the reaction mixture with ethylene oxide so that the ethylene oxide reacts therein to form the substituted polyethylene glycol compound.

The process of the instant invention in another embodiment is process for the preparation of a substituted polyethylene glycol compound having the formula $RO(C_2H_4O)_nY$ wherein R represents a $C_{1-7}$ hydrocarbon group, n represents the average number of moles of $C_2H_4O$ groups, ranging from 100 to 2000 and Y represents hydrogen or an alkali metal, the substituted polyethylene glycol compound having a ratio of weight average molecular weight to number average molecular weight in the range of from 1 to 1.1, the weight average molecular weight and the number average molecular weight of the substituted polyethylene glycol compound being determined by gel permeation chromatography, comprising the steps of: (a) forming a reaction mixture comprising an alcohol represented by the formula $R(OCH_2CH_2)_{0-20}OH$, where R represents a $C_{1-7}$ hydrocarbon group, an alkoxide of the alcohol and a polyether solvent, the reaction mixture being at a temperature in the range of from about 80 to about 140 degrees Celsius, the water concentration of the reaction mixture being less than ten parts per million by weight, the mole ratio of the alkoxide of the alcohol to the alcohol being in the range of from about 0.01 to about 100; (b) contacting the reaction mixture with ethylene oxide so that the ethylene oxide reacts therein to form the substituted polyethylene glycol compound By definition herein an aprotic polar solvent is an aprotic solvent having a dielectric constant of greater than about 8. Preferably the aprotic polar solvent is a polyether solvent such as bis(2-methoxyethyl)ether. Preferably the alcohol is a methyl ether of an ethylene glycol. A particularly suitable alcohol in the instant invention is diethyleneglycol methyl ether. Preferably, the temperature of reaction in the instant invention is in the range of from about 90 to about 110 degrees Celsius (and more preferably about 100 degrees Celsius). Preferably, the ethylene oxide is contacted with the reaction mixture as a gas under pressure in the range of from about two to about ten atmospheres. Preferably, the concentration of the substituted polyethylene glycol compound in the reaction mixture at the end of step (b) is in the range of from about 20 to about 80 weight percent of the reaction mixture. More preferably the concentration of the substituted polyethylene glycol compound in the reaction mixture at the end of step (b), in the range of from about 40 to about 60 weight percent of the reaction mixture.

The reaction mixture at the end of step (b) is likely to contain polyethylene glycol. However, it is preferable in the process of the instant invention that the reaction mixture at the end of step (b) contain polyethylene glycol at a concentration of less than ten mole percent of the total moles of polyethylene glycol and the substituted polyethylene glycol compound. More preferably, such concentration of polyethylene glycol is less than five mole percent of the total moles of polyethylene glycol and the substituted polyethylene glycol compound. Most preferably, such concentration of polyethylene glycol is less than two and one half mole percent of the total moles of polyethylene glycol and the substituted polyethylene glycol compound. Again, the polyethylene glycol concentration is determined by liquid chromatography under critical conditions.

As discussed above, a the end of step (b) of process the instant invention the substituted polyethylene glycol compound has the formula $RO(C_2H_4O)_nY$ where Y is hydrogen or an alkali metal. It should be understood that $RO(C_2H_4O)_nY$ is an empirical formula, that Y can be a mixture of hydrogen and an alkali metal and that when Y is an alkali metal the compound may be dissociated.

It is theorized (although it should be understood that applicants are not to be held to such theory) that the use of the preferred polyether aprotic polar solvents (such as bis (2-methoxyethyl) ether) and/or the use of the preferred polyether alcohols (such as diethyleneglycol methyl ether) promote dissociation of the alcohol alkoxide into its respective ions because such solvents and alcohols tend to complex the alkali metal of the alcohol alkoxide. An additional benefit of the use of the preferred polyether aprotic polar solvents that applicants theorize (without being held to such theory) is the like nature of the solvent in relation to the growing polymer chain, thereby further promoting the obtention of higher molecular weight polymer.

With regard to molecular weight distribution, it is theorized (although again it should be understood that applicants are not to be held to such theory) that by using such solvents and alcohols in anionic ethylene oxide polymerizations, the rate of initiation becomes faster with respect to the rate of propagation and that the rate of termination is very small with respect to the rate of propagation. In the typical anionic ethylene oxide polymerization, the rate of initiation is slower that the rate of propagation, and the molecular weight distribution is expected to broaden. However, due to their ability to complex cations, a polyether solvent and a polyether alcohol in the process of the instant invention is theorized to increase the rate of initiation with respect to the rate of propagation and thus promote a narrower molecular weight distribution of the substituted polyethylene glycol compound. A narrow molecular weight distribution of the substituted polyethylene glycol compound is desired for the above discussed PEGylation applications.

Since water initiates ethylene oxide polymerization to form polyethylene glycol ("diol") and since diol is undesired in the substituted polyethylene glycol compound of the instant invention, it is beneficial to minimize the water concentration of the reaction mixture during step (b) of the process of the instant invention. When water is present at the beginning of the reaction, the molecular weight of the PEG will be about two times greater than the molecular weight of the substituted polyethylene compound. There are several potential sources of water, including water in the solvent, alcohol and ethylene oxide; water entering the reactor from outside the reactor, hydroxide in the base; and water generated by dehydration of a polyethylene glycol alcohol.

The polymerization solvent may be dried by, for example, addition of activated molecular sieves. The sieves are removed by filtration before the solvent is added to the polymerization reactor. Alternatively or additionally, the polymerization solvent may be passed through a column of activated alumina to remove water and other protic impurities. An additional column of activated molecular sieves may also be used. By definition herein, the number of moles of akoxide used is the same as the number of moles of base (such as alkali metal or alkali metal hydride) used to produce the alkoxide. The use of potassium hydride to generate the alkoxide is preferred.

Ethylene oxide is commercially available having a water content of less than 5 ppm by weight. Any nitrogen directed to the reactor is preferably dried to a dew point of less than $-100°$ C. using, for example, a Drierite gas drying system. Additions to the reactor should be made in a manner that excludes contamination by atmospheric moisture. The reactor system is best dried by carrying out a reaction and discarding the first batch. Following a rinse with dry solvent to remove the reaction product of such first batch, the reactor system is sealed in preparation for the next batch.

The temperature during step (b) is in the range of from about 80 to about 140° C., and preferably from about 90 to about 110° C. The alkali metal of the alkoxide is preferably potassium. Reactor pressure is chosen to suit the pressure rating of the reactor, but is generally from about 15 to less than 100 psia. The molar ratio of ethylene oxide to alkali metal alkoxide is chosen to produce a polymer of the desired molecular weight. The specific alcohol is chosen to provide the desired terminal group, which is typically a monomethyl group. The alcohol preferably contains ethylene glycol units, such as diethyleneglycol methyl ether (Dowanol DM Trade Name from The Dow Chemical Company), which, as discussed above, may promote the rate of initiation.

The polymerization solvent is chosen from inert aprotic polar solvents that are preferably easily purified. Glycol ether solvents such as diglyme (bis(2-methoxyethyl)ether) are preferred. The amount of solvent used is adjusted to control the polymerization viscosity, and may be in the range to provide a substituted polyethylene glycol compound containing 20 to 80 wt % solvent, but typically 40 to 60 wt % solvent. Higher molecular weight substituted polyethylene glycol compounds of the instant invention generally produce a higher viscosity solution for any given concentration in the solvent.

After step (b), the reaction mixture is mixed with, for example, a precipitating solvent such as a heptane or hexane to precipitate the product in a solid form and remove the polymerization solvent. An acid such as acetic acid is preferably also added to precipitate a neutral product.

Liquid chromatography under critical conditions has been used to determine polyethylene glycol in mPEG (see, for example, Kazanskii et al., Polymer Science, Series A, Vol 42, No. 6 (2000), p585–595. However, the degree of resolution of the polyethylene glycol and mPEG peaks is usually poor (see FIG. 2 of the Kazanskii et al. reference). The degree of resolution of the polyethylene glycol and mPEG peaks in liquid chromatography under critical conditions can be significantly improved by derivatizing the polyethylene glycol and mPEG with, for example, dinitrobenzoyl chloride.

The amount of polyethylene glycol in the instant invention is determined by the following procedure: (a) 0.1 gram of the compound is mixed with one milliliter of dry acetonitrile containing 150 microequivalents of 4-dimethylaminopyridine and one milliliter of dry acetonitrile containing 150 microequivalents of dinitrobenzoyl chloride, which mixture is heated at 100 degrees Celsius for 15 minutes, and then quenched with three milliliters of water to produce a sample for injection; (b) 5 microliters of the sample for injection is injected into a moblile phase of 52% A and 48% B (where A is 47% acetonitrile in water and B is 43% acetonitrile in water) at a mobile phase flow rate of 0.75 milliliters per minute and flowed through a 5 micrometer packing diameter Zorbax Brand SB300 C18 reverse phase column at a column temperature of 32 degrees Celsius, the column having an internal diameter of 4.6 millimeters and a length of 150 millimeters, followed by a UV detector (absorbance at 230 nanometers) to produce a chromatogram; (c) the chromatogram having a peak at about 2.5 minutes (primarily related to excess dinitrobenzoyl chloride), a peak at about 4.5 minutes for the derivatized substituted polyethylene compound of the instant invention and a well resolved peak at about 9.5 minutes for the derivatized polyethylene glycol (derivatized diol). The mole percent amount of polyethylene glycol of the total moles of polyethylene glycol and the substituted polyethylene glycol compound of the instant invention is defined herein as: one half the area of the derivatized polyethylene glycol peak divided by the sum of one half the area of the derivatized polyethylene glycol peak and the area of the peak for the derivatized substituted polyethylene compound of the instant invention, multiplied by 100.

It should be understood that the above procedure relates to a specific reverse phase column operated under specific critical conditions and that, as is well known in the art of liquid chromatography under critical conditions, it will probably be necessary to determine the critical conditions for another specific system, which critical conditions will probably be at a variance with the above conditions but which critical conditions can be determined by reasonable experimentation.

EXAMPLE

A 5-gallon stainless steel reactor, rinsed twice with 10 Kg of diglyme following the previous batch, is loaded with 28.02 g (0.233 mol) of anhydrous di(ethylene glycol)methyl ether (Dowanol DM, stored over 4 Å molecular sieves), 3.21 g (0.024 mol) of 30% potassium hydride, and 7.32 Kg of diglyme. The diglyme is transferred to the reactor through a 2"×36" column of activated alumina followed by a 2"×36" column of 8–12 mesh 3 angstrom activated molecular sieves at a rate of about 0.08 Kg/min. The reactor is heated to 100° C. The water concentration of the reaction mixture is determined to be 6.3 ppm. Following a pressure test of the ethylene oxide (EO) direct feed (DF) tank, the DF tank is loaded with 7.480 Kg (170 mol) of EO (water content <5 ppm). The 5-gallon reactor is vented to less than about 35 psia, and the EO addition is started. The EO is added at a rate to maintain a pressure of less than 100 psia at a temperature of 100° C., and continues for seven hours. After the EO addition is complete, the reactor is cooled to 70° C. and a vacuum is applied. The pressure is adjusted to 1–2 psia by addition of nitrogen through a dip pipe. The purge is continued for one hour and then the vacuum valve is closed. The reactor is pressurized to about 35 psia, and the product emptied through the bottom valve into a 5-gallon stainless steel can. The reactor is rinsed twice with 10 Kg portions of diglyme. After the second rinse, the empty reactor is heated to 140° C. with a nitrogen purge out of the bottom valve and the vent valve on the top of the reactor for approximately 15 minutes. The reactor is sealed and cooled for a subsequent reaction.

A 5.0 Kg portion of the mPEG reactor product is loaded into a 12-L jacketed bottom-drain glass vessel positioned above a 50-L glass bottom-drain round-bottom flask. The temperature in the 12-L flask is maintained at 65° C. using a recirculating water bath. The transfer line to the 50-L vessel is heated to approximately 70° C. using heat tape. The 50-L vessel is loaded with 17.3 Kg of heptane and 1.3 g of acetic acid. The warm mPEG solution is transferred to the 50-L flask over 63 minutes, forming a white precipitate. The temperature in the 50-L vessel increases from ambient to 36° C. during the addition. The slurry is stirred overnight, then the solid is isolated by vacuum filtration. The filtercake is collected in 3-L fritted funnels and rinsed with 8.5 Kg of fresh heptane. The wetcake is transferred to drying trays, and dried at 30° C. under vacuum to a constant weight over 44 hours. The resulting mPEG product is characterized by GPC analysis to determine the polymer characteristics such as molecular weight and polydispersity (D). The peak molecular weight (Mp) is 28,613. The number average molecular weight (Mn) is 28,176. The weight average molecular weight (Mw) is 28,910. The molecular weight dispersion (Mw/Mn) is 1.026. PEG diol content is determined by liquid chromatography under critical conditions.

ADDITIONAL EXAMPLES

The following Table 1 lists various reaction recipies using the system outlined in the above example (Batch 4046 is the above example). The following Table 2 lists the analysis results for the various batches of Table 1.

TABLE 1

| Batch | Dowanol DM Wt g | 30% KH Wt g | Eq Base | Diglyme Wt g | EO Wt g | Polymer Wt % | Rxn Time Hours (h) | EO Addition Rate kg/h |
|---|---|---|---|---|---|---|---|---|
| 3178 | 40.00 | 6.80 | 0.15 | 4800 | 7005 | 59.4 | 6.0 | 1.17 |
| 3179 | 40.10 | 6.70 | 0.15 | 4820 | 7000 | 59.3 | 5.1 | 1.37 |
| 3181 | 80.00 | 13.50 | 0.15 | 2400 | 3435 | 59.3 | 2.3 | 1.49 |
| 4006 | 40.05 | 4.52 | 0.10 | 4800 | 6860 | 58.9 | 7.4 | 0.92 |

TABLE 1-continued

| Batch | Dowanol DM Wt g | 30% KH Wt g | Eq Base | Diglyme Wt g | EO Wt g | Polymer Wt % | Rxn Time Hours (h) | EO Addition Rate kg/h |
|---|---|---|---|---|---|---|---|---|
| 4008 | 26.99 | 3.00 | 0.10 | 8100 | 6810 | 45.7 | 11.0 | 0.62 |
| 4012 | 40.01 | 4.45 | 0.10 | 4800 | 6860 | 58.9 | 10.0 | 0.69 |
| 4013 | 40.00 | 4.46 | 0.10 | 4800 | 7100 | 59.8 | 10.0 | 0.71 |
| 4018 | 40.01 | 4.46 | 0.10 | 4800 | 7110 | 59.8 | 5.8 | 1.24 |
| 4019 | 27.03 | 3.00 | 0.10 | 8120 | 7095 | 46.7 | 6.5 | 1.09 |
| 4024 | 15.01 | 1.68 | 0.10 | 9780 | 5060 | 34.2 | 5.5 | 0.92 |
| 4025 | 25.01 | 2.79 | 0.10 | 7500 | 6565 | 46.8 | 7.5 | 0.88 |
| 4028 | 18.04 | 2.01 | 0.10 | 8110 | 6760 | 45.5 | 10.0 | 0.68 |
| 4029 | 13.30 | 1.50 | 0.10 | 4840 | 5200 | 51.8 | 8.0 | 0.65 |
| 4034 | 80.02 | 8.91 | 0.10 | 2420 | 3490 | 59.5 | 4.5 | 0.78 |
| 4036 | 20.42 | 2.34 | 0.10 | 8020 | 7875 | 49.6 | 9.0 | 0.88 |
| 4039 | 40.02 | 4.54 | 0.10 | 4800 | 7120 | 59.8 | 8.0 | 0.89 |
| 4041 | 40.02 | 4.57 | 0.10 | 4820 | 7125 | 59.7 | 7.0 | 1.02 |
| 4042 | 20.01 | 2.35 | 0.11 | 8020 | 7875 | 49.6 | 12.0 | 0.66 |
| 4046 | 28.02 | 3.21 | 0.10 | 7320 | 7480 | 50.6 | 7.0 | 1.07 |
| 4047 | 20.00 | 2.35 | 0.11 | 8020 | 7870 | 49.6 | 9.5 | 0.83 |

TABLE 2

| Batch | Theor MW | Mn | Mw | Mp | D | Mol % Diol | Total water g | ppm water |
|---|---|---|---|---|---|---|---|---|
| 3181 | 5273 | 4619 | 4769 | 4739 | 1.032 | 0.54 | 0.065 | 10.9 |
| 4034 | 5354 | 4729 | 4884 | 4837 | 1.033 | 0.63 | 0.076 | 12.7 |
| 4006 | 20674 | 18735 | 19283 | 18852 | 1.029 | 2.89 | 0.174 | 14.9 |
| 4012 | 20695 | 19896 | 20389 | 20095 | 1.025 | 2.02 | 0.121 | 10.3 |
| 3179 | 21068 | 20125 | 20829 | 20515 | 1.035 | 2.44 | 0.147 | 12.4 |
| 3178 | 21135 | 16513 | 17350 | 16394 | 1.11 | 19.9 | 1.19 | 100.5 |
| 4013 | 21420 | 19479 | 20098 | 19763 | 1.032 | 1.88 | 0.113 | 9.46 |
| 4018 | 21445 | 23827 | 24501 | 24116 | 1.028 | 3.88 | 0.233 | 19.5 |
| 4039 | 21469 | 20551 | 21127 | 20748 | 1.028 | 2.54 | 0.152 | 12.7 |
| 4041 | 21484 | 19665 | 20046 | 20048 | 1.019 | 1.62 | 0.097 | 8.09 |
| 4008 | 30398 | 28870 | 29903 | 29373 | 1.036 | 2.95 | 0.119 | 7.97 |
| 4019 | 31618 | 28118 | 28976 | 28707 | 1.031 | 3.11 | 0.126 | 8.27 |
| 4025 | 31619 | 32227 | 33151 | 32837 | 1.029 | 3.60 | 0.134 | 9.51 |
| 4046 | 32154 | 28176 | 28910 | 28613 | 1.026 | 2.23 | 0.094 | 6.32 |
| 4024 | 40573 | 31945 | 32586 | 32469 | 1.02 | 3.37 | 0.076 | 5.12 |
| 4028 | 45087 | 38713 | 39678 | 39586 | 1.025 | 3.84 | 0.104 | 6.99 |
| 4036 | 46398 | 39574 | 40802 | 40506 | 1.031 | 5.19 | 0.159 | 9.99 |
| 4029 | 47037 | 39015 | 40244 | 39711 | 1.032 | 4.04 | 0.081 | 8.06 |
| 4047 | 47340 | 41996 | 43669 | 42756 | 1.040 | 3.42 | 0.103 | 6.45 |
| 4042 | 47346 | 40983 | 42457 | 41818 | 1.036 | 4.36 | 0.131 | 8.23 |

In the above tables, wt is weight; g is grams; KH is potassium hydride; Eq is equivalent; EO is ethylene oxide; Rxn Time is reaction time; kg is kilograms; Theor MW is theoretical molecular weight; Mn is number average molecular weight; Mw is weight average molecular weight; Mp is peak molecular weight; D is molecular weight distribution ratio or Mw divided by Mn; Mol % is mole percent; and ppm is parts per million by weight.

In conclusion, it should be readily apparent that although the invention has been described above in relation with its preferred embodiments, it should be understood that the instant invention is not limited thereby but is intended to cover all alternatives, modifications and equivalents that are included within the scope of the invention as defined by the following claims.

What is claimed is:

1. A process for the preparation of a substituted polyethylene glycol compound having the formula

wherein R represents a $C_{1-7}$ hydrocarbon group, n represents the average number of moles of $C_2H_4O$ groups, ranging from 600 to 2000 and Y represents hydrogen or an alkali metal, the substituted polyethylene glycol compound having a ratio of weight average molecular weight to number average molecular weight in the range of from 1 to 1.1, the weight average molecular weight and the number average molecular weight of the substituted polyethylene glycol compound being determined by gel permeation chromatography, comprising the steps of: (a) forming a reaction mixture comprising an alcohol represented by the formula $R(OCH_2CH_2)_{0-20}OH$, where R represents a $C_{1-7}$ hydrocarbon group, an alkoxide of the alcohol and a polyether solvent, the reaction mixture being at a temperature in the range of from about 80 to about 140 degrees Celsius, the water concentration of the reaction mixture being less than ten parts per million by weight, the mole ratio of the alkoxide of the alcohol to the alcohol being in the range of from about 0.01 to about 100; (b) contacting the reaction mixture with ethylene oxide so that the ethylene oxide reacts therein to form the substituted polyethylene glycol compound.

2. The process of claim 1, wherein the polyether solvent is bis(2-methoxyethyl)ether.

3. The process of claim 1, wherein the alcohol is diethyleneglycol monomethyl ether.

4. The process of claim 2, wherein the alcohol is diethyleneglycol monomethyl ether.

5. The process of claim 4, wherein the temperature of the reaction mixture is in the range of from about 90 to about 110 degrees Celsius.

6. The process of claim 4, wherein the concentration of the substituted polyethylene glycol compound in the reaction mixture at the end of step (b) is in the range of from about 20 to about 80 weight percent of the reaction mixture.

7. The process of claim 4, wherein the concentration of the substituted polyethylene glycol compound in the reaction mixture at the end of step (b) is in the range of from about 40 to about 60 weight percent of the reaction mixture.

8. The process of claim 4, wherein the reaction mixture at the end of step (b) also contains polyethylene glycol, the amount of polyethylene glycol being less than ten mole percent of the total moles of polyethylene glycol and the substituted polyethylene glycol compound, the amount of the polyethylene glycol being determined by liquid chromatography under critical conditions.

9. The process of claim 4, wherein the reaction mixture at the end of step (b) also contains polyethylene glycol, the amount of polyethylene glycol being less than five mole percent of the total moles of polyethylene glycol and the substituted polyethylene glycol compound, the amount of the polyethylene glycol being determined by liquid chromatography under critical conditions.

10. The process of claim 4, wherein the reaction mixture at the end of step (b) also contains polyethylene glycol, the amount of polyethylene glycol being less than two and one half mole percent of the total moles of polyethylene glycol and the substituted polyethylene glycol compound, the amount of the polyethylene glycol being determined by liquid chromatography under critical conditions.

11. The process of claim 1, further comprising the step after step (b) of adding an acid to the reaction mixture so that Y is essentially hydrogen.

12. The process of claim 1, further comprising the step after step (b) of mixing the reaction mixture with a nonpolar solvent to precipitate the substituted polyethylene glycol compound.

13. The process of claim 1, further comprising the step after step (b) of mixing the reaction mixture with a mixture comprising a nonpolar solvent and an acid to precipitate the substituted polyethylene glycol compound wherein Y is essentially hydrogen.

14. The process of claim 1, wherein n is at least 700.

15. The process of claim 1 where the alcohol is a polyether alcohol.

* * * * *